Mar. 27, 1923.

C. L. PECK.
REMOVAL OF SOLID PARTICLES FROM LIQUIDS.
FILED JULY 7, 1920.

Inventor
Charles Lee Peck
By his Attorneys

Patented Mar. 27, 1923.

1,449,622

UNITED STATES PATENT OFFICE.

CHARLES LEE PECK, OF NEW YORK, N. Y., ASSIGNOR TO THE DORR COMPANY, A CORPORATION OF DELAWARE.

REMOVAL OF SOLID PARTICLES FROM LIQUIDS.

Application filed July 7, 1920. Serial No. 394,529.

*To all whom it may concern:*

Be it known that I, CHARLES LEE PECK, a citizen of the United States, residing at New York city, in the county of New York, State of New York, have invented certain new and useful Improvements in the Removal of Solid Particles from Liquids; and I do hereby declare the following to be a full, clear, and exact description of the invention, such as will enable others skilled in the art to which it appertains to make and use the same.

This invention relates to the removal of solid particles from a liquid containing the same, and has for its object the provision of an improved method of and apparatus for removing solid particles from a liquid in which such particles are contained.

While the present invention is generally applicable to the removal of solid particles from any character of liquid containing the same, it is of particular utility in the treatment of sewage, trade waste liquors, and the like. Ordinary domestic or municipal sewage, trade waste liquors, and similar liquids contain varying amounts of solid matter or particles which it is frequently desirable or even necessary to remove therefrom. Such solid matter may constitute in itself a valuable product and its removal from the liquid may be desirable to effect its recovery for subsequent use, or the solid matter may constitute an objectionable contamination of the liquid and its removal therefrom may be desirable as a step in the purification of the liquid or in the preparation of the liquid for some subsequent treatment.

In the treatment of sewage, trade waste waters, and the like, I have found that a rotating cylindrical screen can be very effectively employed for removing solid particles from the liquor. I have found, in particular, that a screen having a hollow foraminated cylindrical member rotatably mounted in a suitable receptacle containing the liquid under treatment and arranged to permit a flow of liquid from the receptacle through the foraminated member into the interior of the screen and out one end thereof can be very successfully used for removing solid particles from a liquid. Rotating screens of this type are well known in the art, but as the result of my investigations and experiences I find that the heretofore existing forms of such screens possess certain defects which render their satisfactory use for removing solid particles from a liquid extremely difficult and often impracticable, and it is the particular aim of the present invention to provide an improved apparatus of this type for removing solid particles from a liquid in which the aforementioned defects are eliminated.

In accordance with my present invention, the liquid containing solid particles is subjected to a screening operation in the course of which the liquid passes through the interstices of a hollow rotating screening device, preferably a hollow cylindrical screen, into the interior thereof, and the solid particles which do not pass through the interstices of the screening device are moved by the rotation of the device into a solids-collecting compartment, preferably filled with liquid which is permitted to overflow into the main body of liquid undergoing the screening operation, whereupon the solid particles are removed, preferably in an automatic and continuous manner, from the solids-collecting compartment and appropriately drained of the surplus liquid associated therewith. The invention thus contemplates a two-stage process of removing solid particles from the liquid, in the first stage of which rotation of an appropriate screening device is depended upon to move the solid particles into a solids-collecting compartment and in the second stage of which the solid particles are removed from this compartment and from the liquid which collects in this compartment as the result of the method of operation. In particular, the invention contemplates the removal of the solid particles from the solids-collecting compartment in an automatic and continuous manner, with appropriate provision for draining the removed solid particles of the liquid associated therewith. The invention further contemplates the provision of an exteriorly arranged lifting member on the screening device for assisting the movement of solid particles from the main body of liquid undergoing the screening operation into the solids-collecting compartment. These and other improvements in the removal of solid particles from liquids as contemplated by the invention will be fully described hereinafter.

The novel features of the invention which are believed to be patentable are definitely pointed out in the appended claims. These features, together with the construction and mode of operation of certain forms of apparatus embodying the same, will be understood from the following description taken in conjunction with the accompanying drawings, in which;

Figure 1:
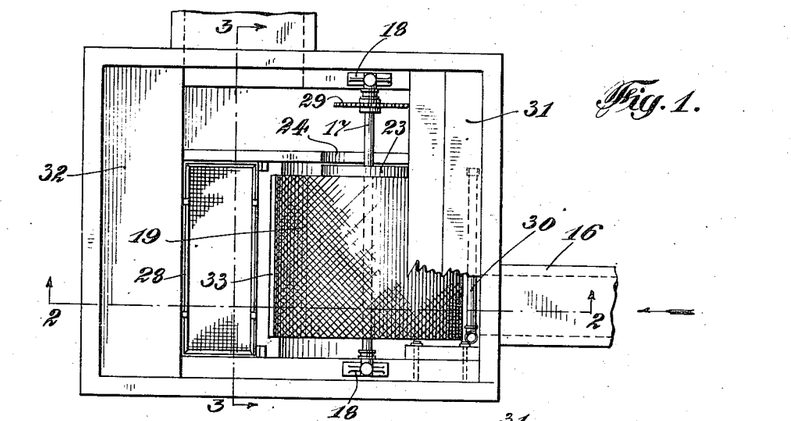
Fig. 1 is a plan of an apparatus embodying the invention.
Figure 2:
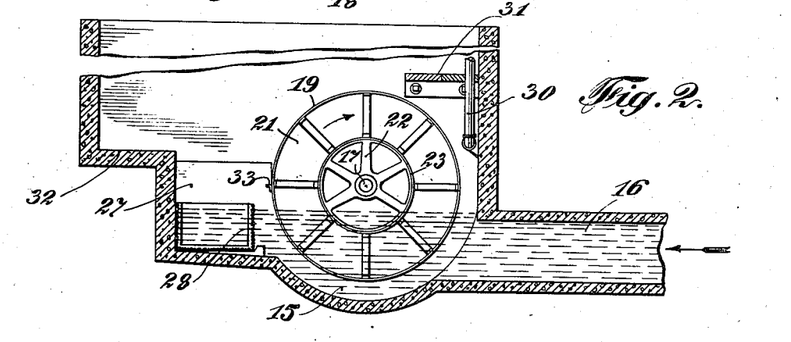
Fig. 2 is a sectional elevation taken on the section line 2—2 of Fig. 1.
Figure 3:
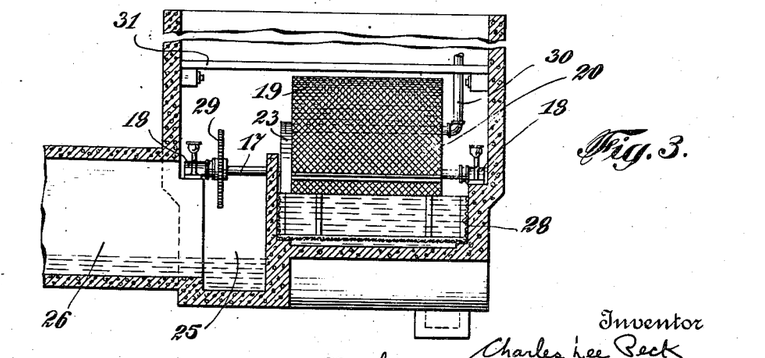
Fig. 3 is a sectional elevation taken on the section line 3—3 of Fig. 1.
Figure 4:
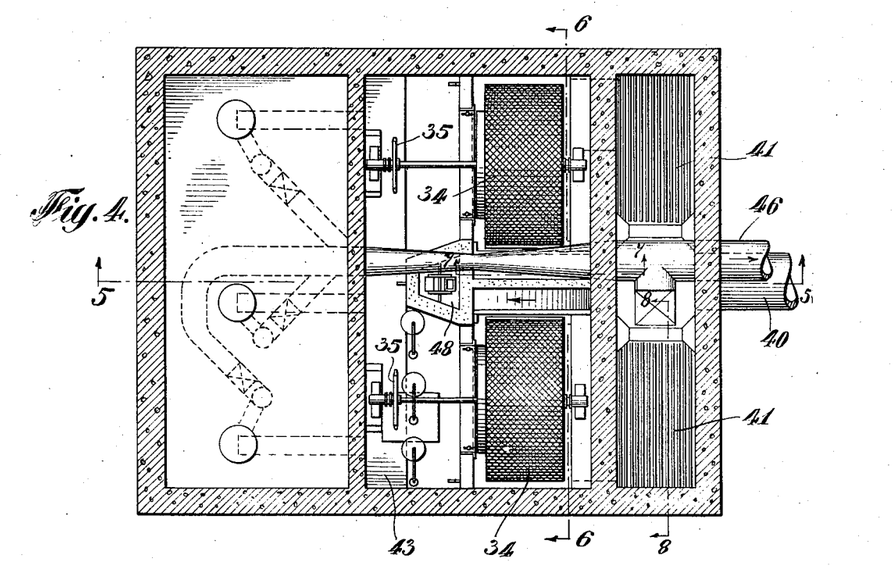
Fig. 4 is a sectional plan, on the section line 4—4 of Fig. 5, of a modified construction of apparatus.
Figure 5:
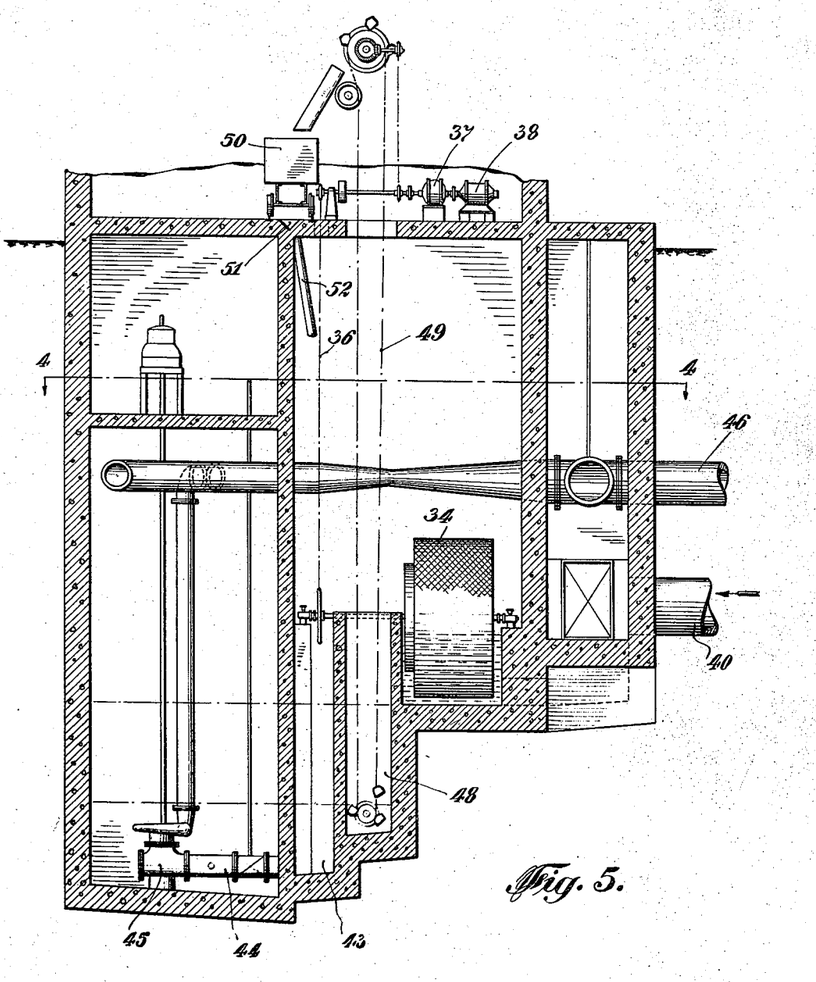
Fig. 5 is a sectional elevation taken on the section line 5—5 of Fig. 4.

Referring first to Figs. 1, 2 and 3 of the drawings, there is shown a screening chamber or receptacle 15 to which the sewage or other liquid to be treated in accordance with the invention is fed by means of a conduit 16. A rotatable shaft 17 having two appropriately supported bearings 18 has secured thereto and carried thereby a hollow cylindrical screening drum 19. One end of the screening drum 19 (the right-hand end as viewed in Fig. 3 of the drawings) is closed by a circular disk 20 concentric with and secured to the shaft 17. The other end of the screen is closed for a sufficient distance inwardly from the periphery thereof by an annular disk 21 concentrically arranged with respect to the shaft 17 and secured thereto by a spider 22. A circular collar 23, registering with the circular opening of the annular disk 21, is also secured to the spider 22 and extends from the end of the screening drum 19 into proximity, but just short of, the adjacent end of the screening chamber 15. This adjacent end of the screening chamber is formed with a circular opening 24, registering with the circular collar 23, whereby the circular opening in the disk 21, the collar 23 and the opening 24 provide a discharge outlet for the flow of screened liquor from the interior of the drum 19 into a spillway 25 having an outlet conduit 26.

A solids-collecting compartment 27 is operatively associated with the screening chamber 15 and is adapted to hold or contain a receptacle 28 into which the solid particles are moved by the rotation of the drum 19 as will be more fully explained hereinafter. The receptacle 28 is preferably in the form of a perforated box or basket and is designed to be manually, or otherwise, removed from the solids-collecting compartment at appropriate intervals.

The shaft 17 and screening drum 19 are rotated by means of a gear 29 secured to the shaft, and driven from any suitable source of power. A spray pipe 30 is arranged for spraying the descending side of the screening drum and serves to clean the screening medium when desired. A platform 31 is arranged above the screening drum for providing convenient access to the operative elements thereof. A platform 32 is also provided adjacent the solids-collecting compartment 27 for the convenience of the operator in removing the receptacles 28.

In operation, the screening drum is slowly rotated, for example, at the rate of approximately 20 R. P. M. in the direction of the arrow in Fig. 2. The liquid to be treated is continuously fed from the conduit 16 into the screening chamber 15, and the screened liquor, which passes through the screening medium of the drum 19, continuously flows from the interior of the drum out of the central end-opening thereof into the spillway 25 and through the conduit 26. The solid particles which do not pass through the interstices of the screening medium are carried by the rotation of the drum towards the solids-collecting compartment, and are, to a large extent, moved or thrown into this compartment by centrifugal force, resulting from the rotation of the screen, and by the hydrostatic head of the screened liquor on the ascending side of the screening drum. Due to the rotation of the screening drum, the screened liquor rises to a higher level on the ascending side of the screen, thereby developing a hydrostatic head of the screened liquor, as the result of which a certain amount of screened liquor flows through the screening medium from the interior thereof, thereby dislodging solid particles adhering to the screening drum and throwing them for the most part into the solids-collecting compartment.

I have found, in practice, that the travel of the solid particles towards the solids-collecting compartment and the moving or throwing of these particles into the solids-collecting compartment, by the rotation of the screen, can be materially assisted by the provision, exteriorly of the screen and parallel to the axis thereof, of a lifting member 33 which may assume the form of a baffle or cleat or angle-iron. This lifting member is secured to the screen and rotates therewith and projects a short distance, for example, about one inch, from the periphery thereof.

I have also found that the travel of the solid particles towards the solids-collecting compartment is assisted when the bottom of the screening chamber 15 conforms approximately to the circular configuration of the screening drum. For this reason, I prefer to construct the bottom of the screening chamber with a configuration approximating that of the cylindrical screening drum, and I find that a clearance of approximately six inches between the bottom of the screening chamber and the periphery of the screening drum very satisfactory in a screen of the general construction shown in Figs. 1, 2 and 3 of the drawings. However, it is to be understood that this clearance depends in a measure upon the size of the apparatus and the quantity of liquid to be treated, and in general, the most satisfactory condition is secured by making this clearance as small as practical considerations permit. By thus constructing the bottom of the screening chamber to approximately conform in configuration with the cylindrical periphery of the screening drum and by making the clearance between these two elements relatively small, a strong current is set up through the space between the periphery of the drum and the bottom of the screening chamber by the rotation of the drum, and the solid particles are thereby effectively moved towards the solids-collecting compartment and are moved into this compartment by the combined three-fold action of centrifugal force, hydrostatic head of the screened liquor on the ascending side of the screen and the lifting member.

The solid particles moved or thrown into the solids-collecting compartment, as hereinbefore described, are caught by and retained in the perforated receptacle 28. Considerable quantities of liquor are thrown over the outer wall or side of the receptacle 28 together with the solid particles, but this liquor flows back into the screening chamber through the perforations of the receptacle 28. The solids-collecting compartment is thus, in the operation of the apparatus, filled with liquid and any surplus liquid thrown into this compartment by the actions aforementioned, appropriately flows back into the main body of the liquid in the screening chamber. When the receptacle 28 has become filled to the desired extent with solid particles, it is raised from the solids-collecting compartment and appropriately drained of the liquid associated therewith.

Raw domestic sewage contains various substances, such as soluble salts in solution, colloidal matter, such as soaps, solid matters having a relatively high nitrogen content such as fecal matter, and solid matters containing little or no nitrogen such as paper, fruit and vegetable parings, etc. In the treatment of sewage, it is generally desirable that the matter rich in nitrogen go along with the screened liquor for subsequent treatment and recovery, while it is desirable to remove from the sewage solid matter poor in nitrogen. The apparatus of my invention is well adapted for the treatment of sewage in this manner and functions, in effect, as a classifier between nitrogen-rich and nitrogen-poor solid matters in the raw sewage liquid. The rotation of the screening drum 19 stirs and agitates the liquid in the screening chamber, and this stirring and agitation breaks up the greater proportion of all of the nitrogen-rich solid matter contained in the raw sewage, and the thus comminuted material passes through the interstices of the screening medium. The lifting member 33 also exercises a disintegrating effect on the nitrogen-rich solid matter in the liquid. Moreover, in the space between the bottom of the screening chamber and the periphery of the screening drum a crushing of the solid material in the liquid takes place, and this action is assisted by the passage of the lifting member 33 through this space and also by the construction of this space with the sectional configuration and dimensions hereinbefore explained.

In Figs. 4, 5, 6, 7 and 8 of the accompanying drawings, there is illustrated a modified construction of apparatus embodying the principles of the present invention. In general, the main features of this modification are the same as in the apparatus hereinbefore described. The modification is of the duplex type and comprises two hollow cylindrical screening drums 34 provided with exteriorly arranged lifting members 33' adapted to be slowly rotated by means of gear wheels 35 driven by a chain belt 36, gear reduction element 37 and electric motor 38. The screening drums 34 are rotated in opposite directions, as indicated by the arrows in Fig. 6. Each of the screening drums 34 is located in a screening chamber 39 to which the liquid to be treated is continuously supplied from a common conduit 40. The inlet liquid from the conduit 40 divides and passes through the two bar screens 41 and thence through the ports 42 into the screening chambers 39.

The screened liquor flows from the interior of each screening drum 34 through the central end opening thereof into a sump 43, from whence it is withdrawn by the outlet pipes 44 and discharged by pumps 45, into a common outlet conduit 46.

Figures 6, 7, 8:
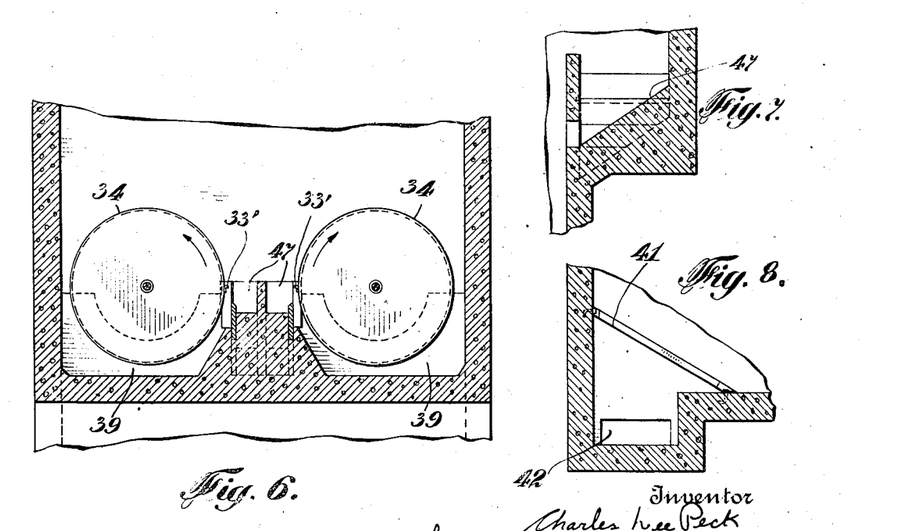
Fig. 6 is a sectional elevation taken on the section line 6—6 of Fig. 4.
Fig. 7 is a detail section on the section line 7—7 of Fig. 4.
Fig. 8 is a detail section on the section line 8—8 of Fig. 4.
Figure 9:
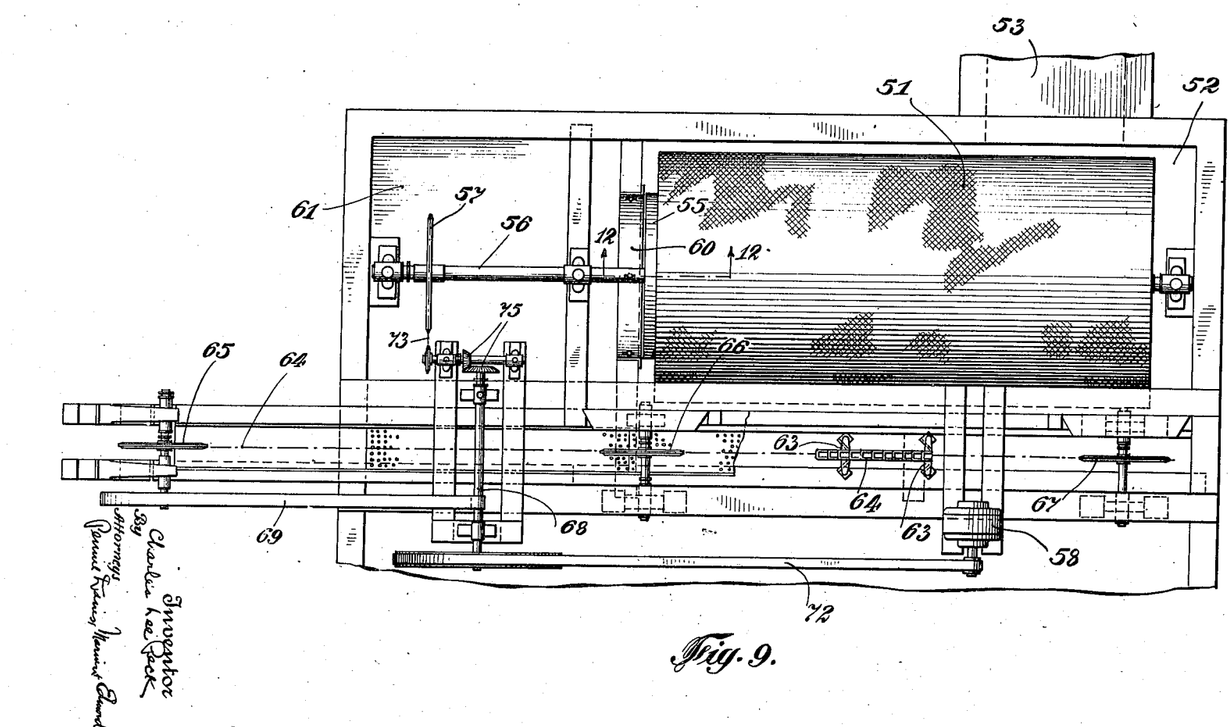
Fig. 9 is a plan of a still further modified construction of apparatus embodying the invention.
Figure 10:
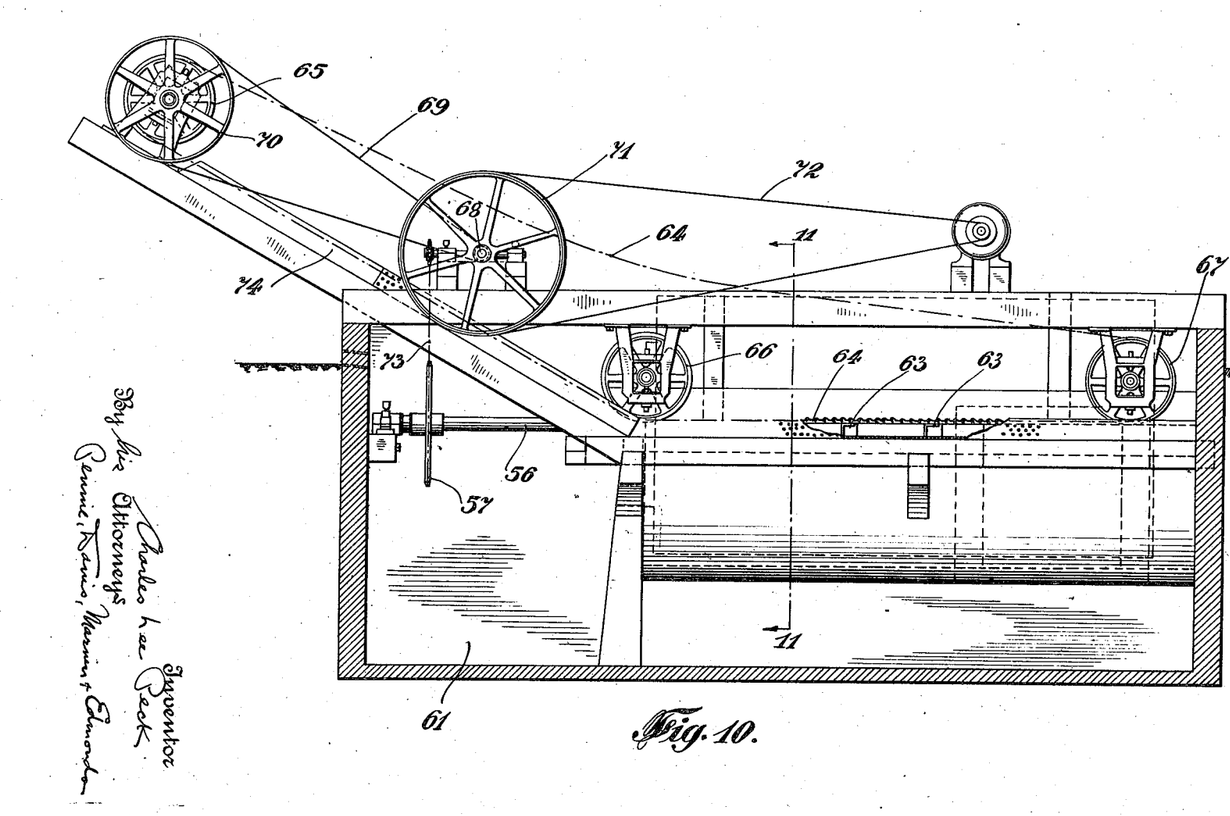
Fig. 10 is an elevation of the apparatus shown in Fig. 9.
Figure 11:
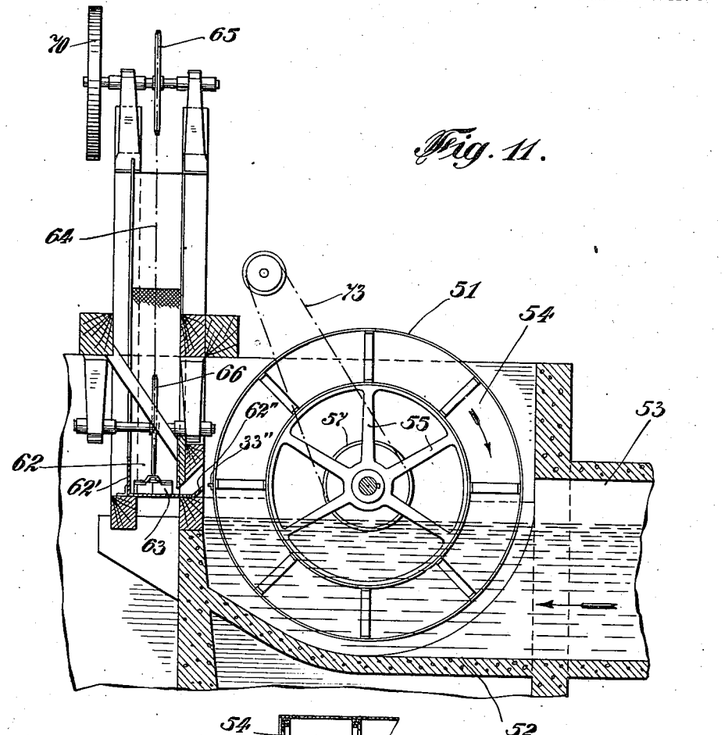
Fig. 11 is a sectional elevation on the section line 11—11 of Fig. 10.
Figure 12:
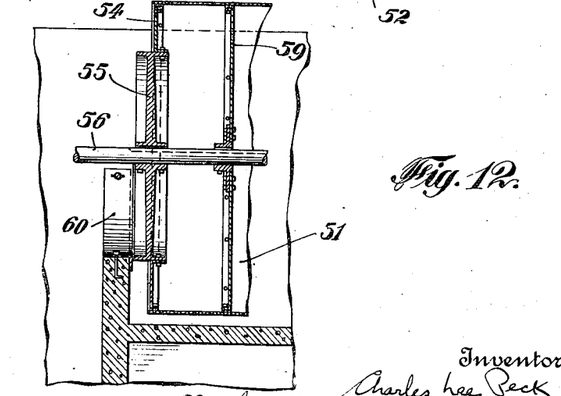
Fig. 12 is a detail section on the section line 12—12 of Fig. 9.

The solid particles are removed from the screening chamber, in substantially the same manner as hereinbefore described in connection with Figs. 1, 2 and 3, into solids-collecting troughs or compartments 47. The troughs 47 have inclined bottoms as indicated in Fig. 7, and open into a solids-collecting well 48. From the well 48, the solids are automatically and continuously removed by a bucket elevator 49 and discharged into an appropriate car 50. In the car 50, the surplus liquid associated with the removed solid matter drains into a trough 51 and is conveyed by a pipe 52 back to the well 48.

Figs. 9, 10, 11 and 12 illustrate another modification of the invention. In this modification, a hollow cylindrical screening drum 51, provided with an axially disposed lifting member 33", is appropriately supported for rotation, in the direction of the arrow in Fig. 11. The drum 51 is operatively arranged in a screening chamber 52, to which the liquid to be treated is continuously supplied by an inlet conduit 53. The bottom of the screening chamber 52 conforms approximately in configuration with the cylindrical periphery of the drum 51 in order to secure the advantages hereinbefore mentioned. As illustrated in this modification of the invention, it is not necessary that the entire bottom of the screening drum be of a configuration approximating that of the screening drum, but the advantages hereinbefore described are secured in a large measure when that portion of the bottom of the screening chamber on the ascending side of the screening drum conforms approximately with the cylindrical peripheral surface of the screening drum.

One end (the right-hand end as viewed in Figs. 9 and 10 of the drawings) of the screening drum is closed by a circular disk, in the manner and for the purposes hereinbefore described. The other end of the screening drum is closed from the periphery inwardly a suitable distance by an annular disk 54 secured to a spider 55. The spider 55 is secured to a rotatably mounted shaft 56 which is adapted to be driven by a sprocket 57 from any suitable source of power, such, for example, as an electric motor 58. A plurality of spaced spiders 59 are secured to the shaft 56 intermediate the ends of the screening drum 51 and serve for appropriately supporting and securing the screening medium of the drum.

The end spider 55 has a cylindrical peripheral rim which registers with a circular opening in the adjacent end wall of the screening chamber 52. An adjustable sector-shaped member 60 rests upon this circular opening in the end wall of the screening chamber, and by its adjustment the clearance between the edge of the rim of the spider 55 and the member 60 may be appropriately varied. The screened liquor is discharged through the spider 55 and over the member 60 into a spillway or sump 61, from whence the liquor may be withdrawn in any appropriate manner.

By the combined action of centrifugal force and the rotation of the lifting member 33", solid particles which do not pass through the interstices of the screening medium are moved towards a solids-collecting compartment 62 and are thrown into this compartment by the combined action of centrifugal force, the lifting member 33" and the hydrostatic head of the screened liquor on the ascending side of the screening drum. The solid particles are removed from the solids-collecting compartment 62 in an automatic and continuous manner by means of a series of spaced scrapers or plows 63 secured to a chain belt 64.

The chain belt 64 is carried and guided by three sprocket wheels 65, 66 and 67. The shaft to which the sprocket wheels 65 is secured is driven from a counter-shaft 68 by a belt 69 and pulley 70. The shaft 68 is driven by the electric motor 58 by means of a pulley 71 and belt 72. The sprocket 57 of the screening drum is connected to the counter-shaft 68 through bevelled gears 75 and a chain belt 73.

The solids-collecting compartment 62 is in the form of a trough of which the outer wall 62' is considerably higher than the inner wall 62", so that surplus liquor thrown into the compartment 62 may flow back over the inner wall 62" into the screening chamber 52.

For the treatment of certain trade waste liquors, such, for example, as the waste liquors of the hide treating art, I have found it advantageous to perforate the bottom of the solids-collecting compartment 62, whereby surplus liquor thrown into this compartment may be drained through such perforations and allowed to flow to waste or collected and subjected to any subsequent appropriate treatment. Similarly, the inclined trough 74, which communicates with the discharge end of the solids-collecting compartment 62 and up which the discharged solids are moved by the scrapers 63, may be perforated for an appropriate distance to effect the desired draining of the removed solids of the liquid associated therewith.

The axially arranged lifting member projecting outwardly from the periphery of the screening drum assists to a very large extent in effectively moving solid particles from the screening chamber into the solids-collecting compartment. The hydrostatic head of the screened liquor on the ascending side of the screening drum will effectively move into the solids-collecting compartment only such solid matter as adheres to the screening medium. In practice, a considerable amount of solid matter will not satisfactorily adhere to the screening medium, and I have found that such solid matter is very effectively moved into the solids-collecting compartment by the action of the lifting member. In the moving of solid particles from the screening chamber, I have moreover found that centrifugal force tends to cause the solid particles to be discharged from the screen at the point at which the screen leaves the liquid, but this force is directed radially from the screen and consequently is ineffective of itself to raise the solid particles into the solids-collecting compartment, the inner wall of this compartment being higher than the level of the liquid in the screening chamber. The rotating lifting member, however, supplements centrifugal force by actually lifting these solid particles, and as a result of this lifting action combined with centrifugal force the solid particles are effectively moved or discharged into the solids-collecting compartment. The lifting member performs a further advantageous function in that it causes, by its rotation, the solid particles to collect around the point of their discharge from the screening chamber into the solids-collecting compartment, thereby assisting the aforementioned actions in removing the solid particles and materially increasing the capacity of the screening apparatus. This increase in the capacity of the screening apparatus is due largely to the fact that the solid particles are effectively moved towards the point of their discharge from the screening chamber, whereby the available screening area throughout the major portion of the cycle is increased because this area is maintained, in a large measure, free of interfering solid matter which otherwise would blind or impair the available screening medium.

A further advantage resulting from the provision of the lifting member is the disintegrating action of this member on the solid matter in the screening chamber. The lifting member, in the course of its travel through the liquid in the screening chamber, agitates and breaks up the pulpous soft solid matter with which it comes in contact, and this disintegration or comminution of solid matter reduces the cost of handling and disposing of the same.

The construction of the bottom of the screening chamber with a configuration conforming substantially with the cylindrical periphery of the screening drum is a further advantage of the present invention. This configuration in combination with the restriction in the space between the bottom of the screening chamber and the periphery of the screening drum causes a scouring action between the solid matter in the liquid and the foraminated screening medium. This scouring action prevents lime and carbonaceous matter from building up in the perforations of the screening medium and thereby blinding the screen. It also causes the solid matter to be comminuted by the combined abrasive action of the rotating foraminated screening member and the abrasive action of the strong currents set up in the restricted space between the bottom of the screening chamber and the screening drum. A further advantage of constricting the space between the foraminated screening member and the bottom of the screening chamber is to set up relatively strong currents in this restricted space and thereby cause the solid particles to move towards and accumulate near their point of discharge from the screening chamber. As hereinbefore explained, the entire bottom of the screening chamber need not be constructed to conform in configuration with the peripheral surface of the screening drum, but the advantages of this construction are secured in a large measure when that portion of the bottom of the screening chamber on the ascending side of the screening drum conforms approximately in configuration with the cylindrical surface of the screening drum.

In the treatment of sewage, trade waste liquors, and the like, I have found that very satisfactory operation is secured by rotating the screen at a peripheral speed of about 300 feet per minute. At peripheral speeds lower than about 150 feet per minute, the interstices of the screening medium tend to clog, and the lifting member fails to effectively exercise its advantageous function of disintegrating the soft or pulpy solid particles in the liquid. For this reason, I prefer, where treating sewage, trade waste liquors or the like to rotate the screen with a peripheral speed exceeding 150 feet per minute, and as hereinbefore stated, I have secured excellent results in practice with a peripheral speed of about 300 feet per minute.

I claim:—

1. The method of removing solid particles from a liquid containing the same, which comprises passing the liquid through the interstices of a hollow rotating screening device into the interior thereof and appropriately withdrawing the thus-screened liquor from the interior of said device, and removing from the liquid undergoing the aforementioned screening treatment the solid particles which do not pass through the interstices of the screening device by the combined effect of centrifugal force and the hydrostatic head of the screened liquor on the ascending side of the screening device and a mechanically produced lifting action.

2. The method of removing solid particles from a liquid containing the same, which comprises passing the liquid through the interstices of a hollow rotating screening device into the interior thereof and appropriately withdrawing the thus-screened liquor from the interior of said device, developing in the body of liquid undergoing the aforementioned screening treatment a relatively strong liquid current tending to carry solid particles towards their point of discharge from said body of liquid, and removing solid particles from said main body of liquid by the combined effect of centrifugal force and the hydrostatic head of the screened liquor on the ascending side of the screening device and a mechanically produced lifting action.

3. An apparatus for removing solid particles from a liquid containing the same, which comprises a plurality of receptacles for containing the liquid, a hollow screening device rotatably mounted in each receptacle, means for supplying liquid to the receptacles from a common inlet, a solids-collecting compartment operatively associated with each receptacle and leading to a solids-collecting well, means for continuously removing the solid particles from the well, and means for removing the treated liquor by a common outlet.

4. An apparatus for removing solid particles from a liquid containing the same, which comprises a plurality of receptacles for containing the liquid, a hollow screening device rotatably mounted in each receptacle, a liquor supply reservoir, a passage from the reservoir to each receptacle, each passage obstructed by a bar screen, a solids-collecting compartment operatively associated with each receptacle and leading to a solids-collecting well, means for continuously removing the solid particles from the well, and means for removing the treated liquor by a common outlet.

5. An apparatus for removing solid particles from a liquid containing the same, which comprises a plurality of receptacles for containing the liquid, a hollow screening device rotatably mounted in each receptacle, a liquor supply reservoir, a passage from the reservoir to each receptacle each passage obstructed by a bar screen, a solids-collecting compartment operatively associated with each receptacle and leading to a solids-collecting well, means for continuously removing the solid particles from the well, a sump for collecting the screened liquor, and means for withdrawing the liquor from the sump.

6. An apparatus for removing solid particles from a liquid containing the same, which comprises a plurality of receptacles for containing the liquid, a hollow screening device rotatably mounted in each receptacle, a liquor supply reservoir, a passage from the reservoir to each receptacle each passage obstructed by a bar screen, a solids-collecting compartment operatively associated with each receptacle and leading to a solids-collecting well, said devices having an axially positioned and exteriorly arranged member for assisting by its travel through the liquid in the receptacles the movement of solid particles from the receptacles into said compartment, means for continuously removing the solid particles from the well, a sump for collecting the screened liquor, and means for withdrawing the liquor from the sump.

In testimony whereof I affix my signature.

CHARLES LEE PECK.